United States Patent
Wang et al.

(10) Patent No.: US 6,954,853 B2
(45) Date of Patent: Oct. 11, 2005

(54) REMOTE BOOT SYSTEM FOR MULTIPLE CLIENT TERMINALS AND METHOD THEREOF

(75) Inventors: Chien-Fa Wang, Banchiau (TW); Pei-Chi Yang, Junghe (TW)

(73) Assignee: Via Technologies, Inc. (TW)

( * ) Notice: Subject to any disclaimer, the term of this patent is extended or adjusted under 35 U.S.C. 154(b) by 562 days.

(21) Appl. No.: 10/173,731

(22) Filed: Jun. 19, 2002

(65) Prior Publication Data

US 2003/0163680 A1 Aug. 28, 2003

(30) Foreign Application Priority Data

Feb. 26, 2002 (TW) .......................................... 91103432 A

(51) Int. Cl.$^7$ ................................................ G06F 1/24
(52) U.S. Cl. ............................ 713/2; 713/1; 713/100; 709/203; 709/219
(58) Field of Search ............................. 713/1, 2, 100; 709/203, 219

(56) References Cited

U.S. PATENT DOCUMENTS

| | | | | |
|---|---|---|---|---|
| 6,421,777 B1 | * | 7/2002 | Pierre-Louis et al. | 713/2 |
| 6,735,692 B1 | * | 5/2004 | Murphrey et al. | 713/1 |
| 6,810,478 B1 | * | 10/2004 | Anand et al. | 713/2 |
| 6,842,786 B1 | * | 1/2005 | Webb | 709/230 |
| 6,854,009 B1 | * | 2/2005 | Hughes | 709/220 |

* cited by examiner

*Primary Examiner*—Rehana Perveen
(74) *Attorney, Agent, or Firm*—Rabin & Berdo, PC

(57) ABSTRACT

A remote boot system. The system includes a remote server, a first local client terminal and a second local client terminal. The remote server has an operating system, and the first local client terminal downloads the operating system from the remote server. The first local client terminal receives a local server discovery signal sent by the second local client terminal and sends a first response signal in response to the local server discovery signal to the second local client terminal. The second local client terminal downloads the operating system from the first local client terminal in response to the first response signal.

24 Claims, 4 Drawing Sheets

REMOTE BOOT SYSTEM FOR MULTIPLE CLIENT TERMINALS AND METHOD THEREOF

BACKGROUND OF THE INVENTION

1. Field of the Invention

The present invention relates to a remote boot system for multiple client terminals and method thereof, and particularly to a remote boot system and method that employs the booted client terminal as a local server to boot other client terminals, so as to improve the efficiency of remote booting and reduce the load on remote servers and networks.

2. Description of the Related Art

In a network environment, client terminals, such as Information PCs, Set Top Boxes (STB), Information Appliances (IA), and Window Based Terminals (WBT) can be booted by downloading the corresponding operating system from a remote server through the network, and executing the boot steps to run the operating system. This is known as remote booting.

FIG. 1 shows the network architecture between client terminals and a remote server. As shown in FIG. 1, WBT (11), Information PC (12), STB (13) and IA (14) are connected to a local area network (10). These terminals may send a request to download operating systems from the remote server (30) outside the local area network (10) through the network (20).

FIG. 2 shows the download of an operating system from a remote server. First, the client terminal (15) sends a boot request packet (21) to the server (30) if the client terminal (15) needs to boot. When the server (30) receives the boot request packet (21), it sends an operating system (22) corresponding to the boot request packet (21) to the client terminal (15). Thereafter, the client terminal (15) executes the boot steps to run the operating system (22).

However, the bandwidth of the network (20) may be compromised if a large number of client terminals in the local area network request booting. Furthermore, the server (30) may crash if the client terminals request to boot at the same time, thereby delaying the boot process.

SUMMARY OF THE INVENTION

It is therefore an object of the present invention to provide a remote boot system and method that employs the booted client terminals as local servers to boot other client terminals, so as to improve the efficiency of remote booting and reduce the load on the remote server and network.

To achieve the above objects, the present invention provides a remote boot system for multiple client terminals and method thereof. According to one embodiment of the invention, the remote boot system includes a remote server, a first local client terminal and a second local client terminal.

The operating system is located in the remote server and the first local client terminal downloads the operating system from the remote server. The first local client terminal receives a local server discovery signal, sent by the second local client terminal, and sends a first response signal in response to the local server discovery signal to the second local client terminal. The second local client terminal downloads the operating system from the first local client terminal in response to the first response signal.

According to the invention, a third local client terminal having the operating system is further provided to receive the local server discovery signal sent by the second local client terminal, and send a second response signal to the second local client terminal in response to the local server discovery signal. Then, the second local client terminal may select one of the client terminals with downloads of the operating system according to a download number contained in the first response signal and second response signal.

Furthermore, the first local client terminal may determine whether the version information contained in the local server discovery signal agrees with the operating system. If the version information does not agree with the operating system, the first response signal is not sent to the second local client terminal. In another embodiment, the second local client terminal may determine whether the version information contained in the first response signal sent by the first local client terminal agrees with the operating system requested by the second local client terminal. If the version information does not agree with the operating system, the second local client terminal stops downloading the operating system from the first local client terminal.

According to another embodiment of the invention, a remote booting method for multiple client terminals is provided. Initially, a first local client terminal downloads an operating system from a remote server. Thereafter, a second local client terminal sends out a local server discovery signal. Then, the first local client terminal receives the local server discovery signal and a first response signal is sent by the first local client terminal in response to the local server discovery signal. Finally, the second local client terminal receives the first response signal and the operating system is downloaded from the first local client terminal by the second local client terminal in response to the first response signal.

Similarly, a third local client terminal having the operating system is further provided to receive the local server discovery signal sent by the second local client terminal. A second response signal is sent by the third local client terminal to the second local client terminal in response to the local server discovery signal. Then, one of the client terminals can be selected to download the operating system according to a download number contained in the first response signal and second response signal.

Furthermore, the first response signal is not sent to the second local client terminal if the version information contained in the local server discovery signal does not agree with the operating system of the first local client terminal. In another embodiment, the version information contained in the first response signal sent by the first local client terminal is verified for agreement with the operating system requested by the second local client terminal. If the version information in the first response signal does not agree with the operating system of the second local client terminal, the second local client terminal stops downloading the operating system from the first local client terminal.

BRIEF DESCRIPTION OF THE DRAWINGS

The aforementioned objects, features and advantages of this invention will become apparent by referring to the following detailed description of the preferred embodiment with reference to the accompanying drawings, wherein.

DETAILED DESCRIPTION OF THE INVENTION

Figure 1:
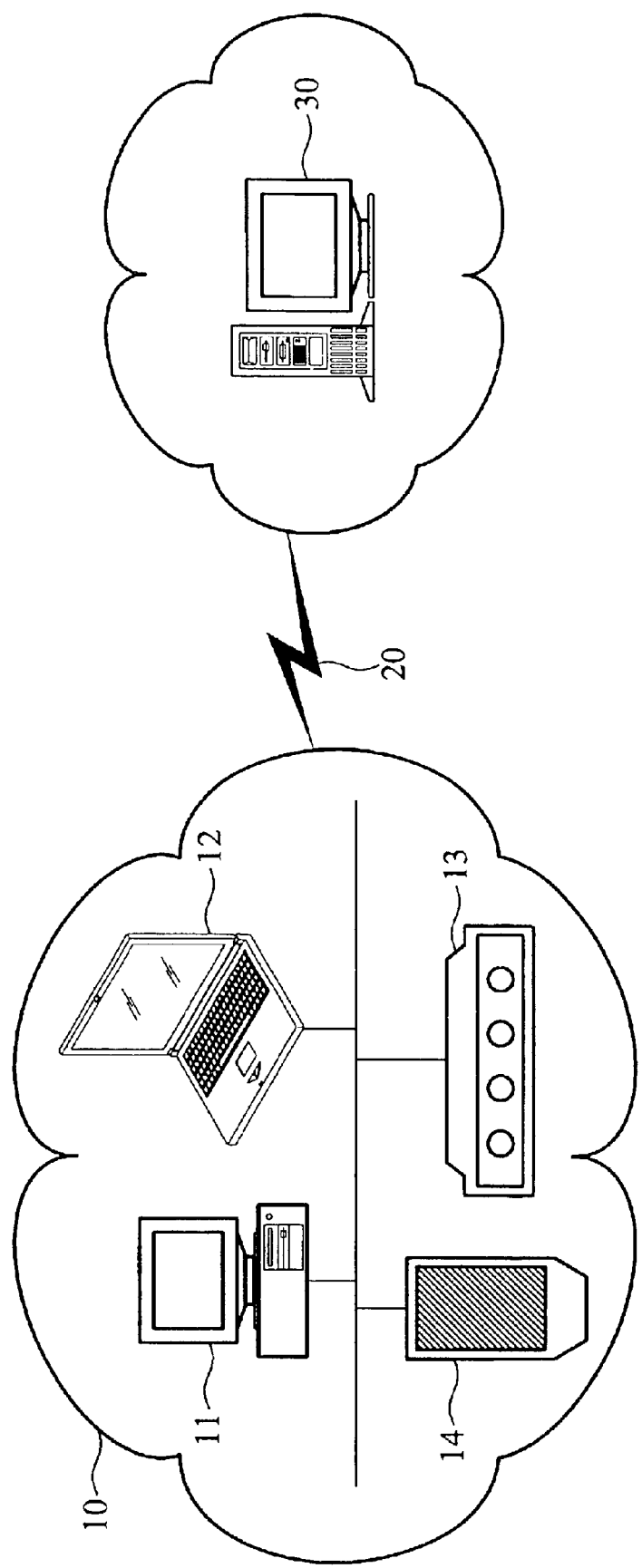
FIG. 1 is a schematic diagram showing the network architecture between client terminals and remote server as found in the prior art.
Figure 2:
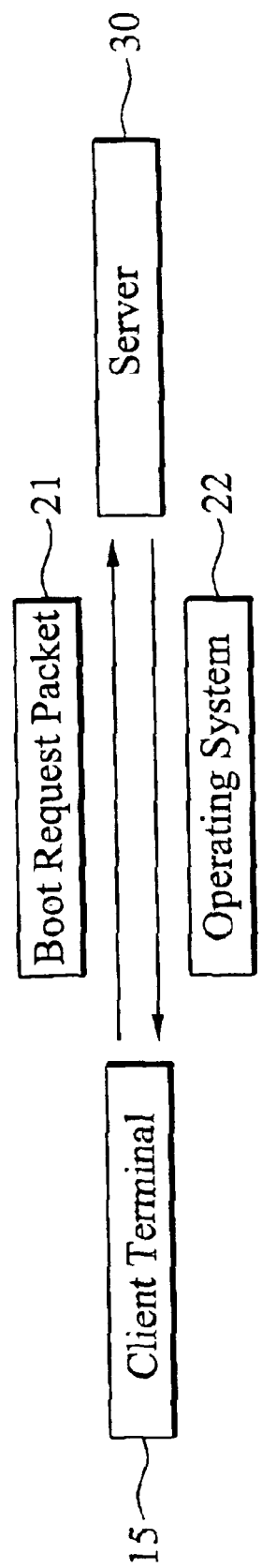
FIG. 2 is a schematic diagram showing the operation of downloading an operating system from a remote server to a client terminal.
Figure 3:
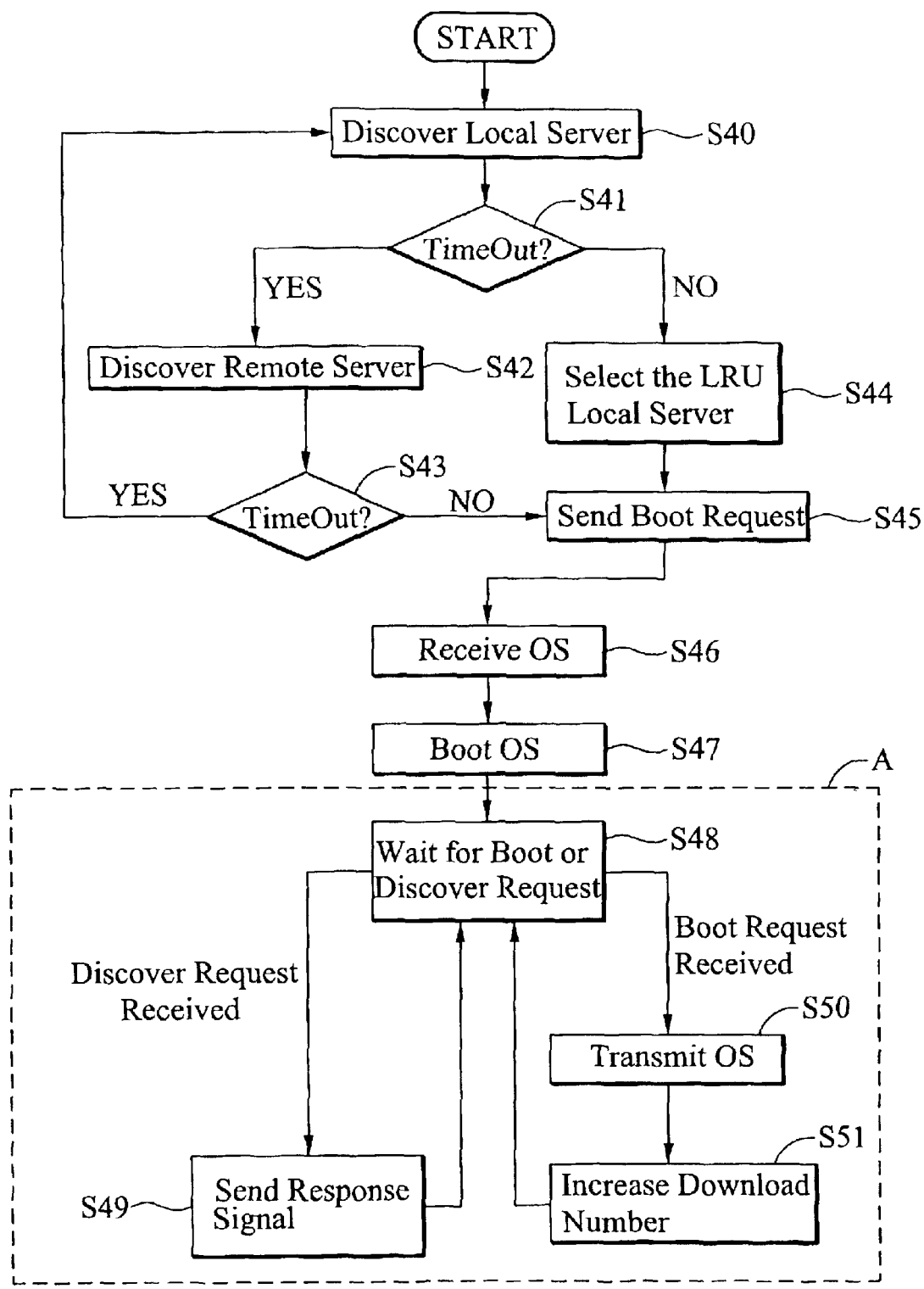
FIG. 3 is a flow chart illustrating the operation of remote booting of client terminals according to the present invention.

FIG. 3 shows the flow chart of remote booting of client terminals according to the present invention.

First, in step S40, the client terminal sends a broadcast packet (local server discovery signal) to discover a local server providing downloads to other client terminals to download the operating system through the local area network. The client terminals may be Information PCs, Set Top Boxes (STB), Information Appliances (IA), and Window Based Terminals (WBT), and the local server may be a client terminal downloading the operating system from a remote server.

The local server discovery signal may contain version information of the operating system requested by the client terminal. Therefore, only the local server having the operating system that agrees with the version information in the local server discovery signal sends a response signal to the client terminal. The response signal contains a download number recording the number of the local server to be downloaded from by client terminals.

After a period of time passes (timeout) and no response signal is received (YES in step S41), the client terminal sends another broadcast packet to a remote area outside the local area network requesting a remote server to download the operating system (S42). If another period of time passes (timeout) and no response signal is received (YES in step S41), the operation returns to step S40. If the client terminal receives a response from the remote server (NO in step S43), a boot request is sent to the remote server to download operating system by the client terminal (S45).

If several response signals sent by local servers are received (NO in step S41), the client terminal assesses the received response signals and selects a local server having the lowest download number to send the boot request (S44 and S45) based on the LRU (Least Recently Used) rule. Thereafter, the client terminal receives the operating system sent by the local server or the remote server (S46), and boots the operating system (S47).

When the client terminal is booted, it then becomes a local server, and the client terminal may provide other client terminals with downloads of the operating system. Block A in FIG. 3 shows the operation of the local server. In step S48, the local server waits to receive the boot request or the local server discovery signal sent by other client terminals.

If the local server discovery signal is received by the local server, the local server assesses whether the version information contained in the local server discovery signal agrees with its own operating system and then sends a response signal containing the download number to the client terminal that sent the local server discovery signal (S49) if the version information in the local server discovery signal agrees with the operating system. If the boot request is received, the local server transmits its own operating system to the client terminal that sent the boot request (S50). The download number is increased by one (S51) when the transmission is concluded.

Each of the local servers will send a response signal carrying the version information of its own operating system to the client terminal if the local server discovery signal sent by the client terminal has no version information. Then, the client terminal may assess the response signal to determine whether the version information in the response signal agrees with the operating system requested by the client terminal. If so, the operating system is downloaded from the local server that sent the response signal. If not, the client terminal will not download the operating system from the local server that sent the response signal.

Figure 4:
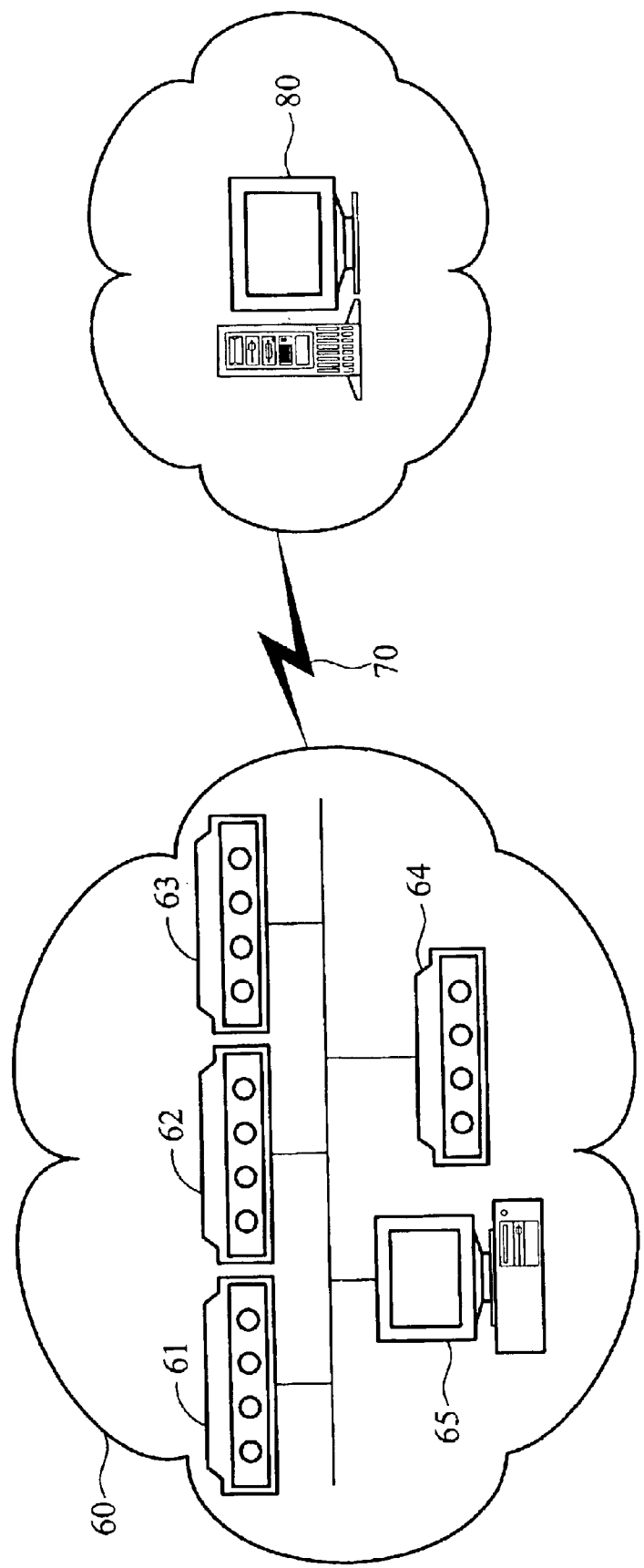
FIG. 4 shows an example of the network architecture between client terminals and the remote server according to the present invention.

FIG. 4 shows an example of network architecture between client terminals and the remote server according to the present invention. As shown in FIG. 4, four STBs (61, 62, 63 and 64) and a WBT (65) are connected to the local area network (60). These terminals are connected to the remote server (80) outside the local area network (60) through the network (70). At first, none of these client terminals are booted.

When the STB (61) needs to remotely boot, it sends a broadcast packet to discover local servers in the local area network (60). The broadcast packet contains version information (STB version) of the operating system requested by the STB (61). Since there is no local server in the local area network (60) now, no response signal is received by the STB (61). Then, the STB (61) sends another broadcast packet to a remote area outside the local area network (60) requesting a remote server to download the operating system. After receiving the broadcast packet, the remote server (80) responds to the STB (61) by sending a response signal. The STB (61) sends a boot request to the remote server (80) in response to the response signal, and the remote server (80) transmits the STB operating system to the STB (61) in response to the boot request. After the transmission is finished, the STB (61) boots its own STB operating system. Then, the STB (61) becomes a local server having the STB operating system in the local area network (60).

When the STB (62) needs to remotely boot, it sends a broadcast packet to discover local servers in the local area network (60). The broadcast packet contains version information (STB version) of the operating system requested by the STB (62). Since the STB (61) is the local server having the STB operating system in the local area network (60), the STB (61) sends a response signal to the STB (62). The response signal contains the download number of the local server. The STB (62) sends a boot request to the STB (61) in response to the response signal, and the STB (61) starts to transmit the STB operating system to the STB (62) in response to the boot request.

When the STB (63) needs to remotely boot, it sends a broadcast packet to discover local servers in the local area network (60). The broadcast packet contains version information (STB version) of the operating system requested by the STB (63). Since the STB (62) is still receiving the STB operating system, that is the STB (62) is not a local server yet, the STB (61) sends a response signal to the STB (63). The STB (63) sends a boot request to the STB (61) in response to the response signal, and the STB (61) starts to transmit the STB operating system to the STB (63) in response to the boot request.

At this time, the STB operating system is completely received by the STB (62). Then, the STB (62) boots its own STB operating system. Then, the STB (62) becomes another local server having the STB operating system in local area network (60), and the STB (61) updates its download number.

When the STB (64) needs to remotely boot, it sends a broadcast packet to discover local servers in the local area network (60). The broadcast packet contains version information (STB version) of the operating system requested by the STB (64). Since the STB (61) and STB (62) are local servers in the local area network (60), both of the STB (61) and STB (62) send a response signal to the STB (64). The STB (64) assesses the download number in the response signals sent by the STB (61) and STB (62), and it selects the STB (62) as the local server to download the operating system from. Then, the STB (64) sends a boot request to the STB (62), and the STB (62) starts to transmit the STB operating system to the STB (64) in response to the boot request.

When the WBT (65) needs to remotely boot, it sends a broadcast packet to discover local servers in the local area network (60). The broadcast packet contains version information (WBT version) of the operating system requested by the WBT (65). Since there is no local server having the WBT operating system in the local area network (60), no response signal is received by the WBT (65). Then, the WBT (65) sends another broadcast packet to a remote area outside the local area network (60) requesting to download the WBT operating system from a remote server. After receiving the broadcast packet, the remote server (80) responds to the WBT (65) by sending a response signal. The WBT (65) sends a boot request to the remote server (80) in response to the response signal, and the remote server (80) transmits the WBT operating system to the WBT (65) in response to the boot request. After the transmission is finished, the WBT (65) boots its own WBT operating system. Then, the WBT (65) becomes a local server having the WBT operating system in local area network (60).

As a result, using the remote boot system for multiple client terminals and method thereof according to the present invention, the booted client terminals can be employed as local servers to boot other client terminals, to improve the efficiency of remote booting and reduce the load on the remote server and network.

Although the present invention has been described in its preferred embodiment, it is not intended to limit the invention to the precise embodiment disclosed herein. Those who are skilled in the art can still make various alterations and modifications without departing from the scope and spirit of this invention. Therefore, the scope of the present invention shall be defined and protected by the following claims and their equivalents.

What is claimed is:

1. A remote boot system, comprising:
    a remote server with an operating system installed;
    a first local client terminal to download the operating system from the remote server, the first local client terminal with the operating system becoming a local server to receive a local server discovery signal, send a first response signal in response thereto, and provide the operating system to local client terminals; and
    a second local client terminal to send the local server discovery signal, receive the first response signal, and download the operating system from the first local client terminal in response thereto, the second local client terminal becoming a local server to provide the operating system to local client terminals after downloading the operating system from the first local client terminal.

2. The system as claimed in claim 1 further comprising a third local client terminal having the operating system to receive the local server discovery signal, and send a second response signal to the second local client terminal in response to the local server discovery signal.

3. The system as claimed in claim 2 wherein the first and second response signals each contain a download number.

4. The system as claimed in claim 3 wherein the second local client terminal further receives the second response signal, and selects the first local client terminal or the third local client terminal to download the operating system according to the download number contained in the first response signal and the second response signal.

5. The system as claimed in claim 1 wherein the local server discovery signal contains version information of the operating system requested by the second local client terminal.

6. The system as claimed in claim 5 wherein the first local client terminal does not send the first response signal to the second local client terminal if the version information in the local server discovery signal does not agree with its own operating system.

7. The system as claimed in claim 1 wherein the first response signal contains version information of the operating system on the first local client terminal.

8. The system as claimed in claim 7 wherein the second local client terminal does not download the operating system from the first local client terminal if the version information in the first response signal does not agree with the operating system needed by the second local client terminal.

9. The system as claimed in claim 1 wherein the first local client terminal is an information PC.

10. The system as claimed in claim 1 wherein the first local client terminal is a set-top-box.

11. The system as claimed in claim 1 wherein the first local client terminal is an information appliance.

12. The system as claimed in claim 1 wherein the first local client terminal is a window-based terminal.

13. A remote booting method for multiple client terminals, comprising the steps of:
    downloading an operating system by a first local client terminal from a remote server, the first local client terminal with the operating system becoming a local server providing the operating system to local client terminals;
    sending a local server discovery signal by a second local client terminal;
    receiving the local server discovery signal and sending a first response signal by the first local client terminal in response to the local server discovery signal; and
    receiving the first response signal, and downloading the operating system from the first local client terminal by the second local client terminal in response to the first response signal, the second local client terminal becoming a local server providing the operating system to local client terminals after downloading the operating system from the first local client terminal.

14. The method as claimed in claim 13 further comprising receiving the local server discovery signal by a third local client terminal having the operating system, and sending a second response signal by the third local client terminal in response to the local server discovery signal.

15. The method as claimed in claim 14 wherein the first and second response signals each contain a download number.

16. The method as claimed in claim 15 further comprising receiving the second response signal by the second local client terminal, and selecting the first local client terminal or the third local client terminal from which to download the operating system according to the download number contained in the first response signal and second response signal.

17. The method as claimed in claim 13 wherein the local server discovery signal contains version information of the operating system needed by the second local client terminal.

18. The method as claimed in claim 17 wherein the first local client terminal does not send the first response signal to the second local client terminal if the version information in the local server discovery signal does not agree with its own operating system.

19. The method as claimed in claim 13 wherein the first response signal contains version information of the operating system on the first local client terminal.

20. The method as claimed in claim 19 wherein the second local client terminal does not download the operating system from the first local client terminal if the version information in the first response signal does not agree with the operating system needed by the second local client terminal.

21. The method as claimed in claim 13 wherein the first local client terminal is an information PC.

22. The method as claimed in claim 13 wherein the first local client terminal is a set-top-box.

23. The method as claimed in claim 13 wherein the first local client terminal is an information appliance.

24. The method as claimed in claim 13 wherein the first local client terminal is a window-based terminal.

* * * * *